United States Patent [19]

Shimizu et al.

[11] Patent Number: 5,494,978
[45] Date of Patent: Feb. 27, 1996

[54] MODIFIED POLYSILAZANE AND PROCESS FOR PREPARATION THEREOF

[75] Inventors: Yasuo Shimizu; Yuuji Tashiro; Hiroyuki Aoki; Masaaki Ichiyama; Hayato Nishii; Toshihide Kishi; Kouji Okuda; Takeshi Isoda, all of Iruma, Japan

[73] Assignee: Tonen Corporation, Tokyo, Japan

[21] Appl. No.: 346,845

[22] Filed: Nov. 30, 1994

Related U.S. Application Data

[63] Continuation of Ser. No. 82,013, Jun. 23, 1993, abandoned, which is a continuation of Ser. No. 816,378, Dec. 27, 1991, abandoned.

[30] Foreign Application Priority Data

Dec. 4, 1991 [JP] Japan ................................ 3-320167

[51] Int. Cl.$^6$ ................................................. C08F 283/12
[52] U.S. Cl. ................. 525/474; 525/38; 525/28; 525/27; 525/26; 525/25; 525/31
[58] Field of Search ........................... 525/474; 528/38, 528/28, 26, 27, 25, 31

[56] References Cited

U.S. PATENT DOCUMENTS

| | | | |
|---|---|---|---|
| 4,840,778 | 6/1989 | Arai et al. | 423/324 |
| 4,929,704 | 5/1990 | Schwark | 528/28 |
| 4,937,304 | 6/1990 | Ayama et al. | 528/34 |
| 4,939,225 | 7/1990 | Vaahs et al. | 528/32 |
| 4,975,712 | 12/1990 | Funayama et al. | 528/28 |
| 4,992,523 | 2/1991 | Bacque et al. | 528/34 |
| 5,021,533 | 6/1991 | Schwark | 528/21 |
| 5,032,551 | 7/1991 | Tashiro et al. | 501/95 |
| 5,032,649 | 7/1991 | Schwark | 525/474 |
| 5,086,126 | 2/1992 | Mahone | 525/474 |

FOREIGN PATENT DOCUMENTS

| | | |
|---|---|---|
| 0304239 | 2/1989 | European Pat. Off. . |
| 0303498 | 2/1989 | European Pat. Off. . |
| 0430080 | 6/1991 | European Pat. Off. . |
| 0442013 | 8/1991 | European Pat. Off. . |
| 60-145903 | 8/1985 | Japan . |

*Primary Examiner*—John C. Bleutge
*Assistant Examiner*—Margaret W. Glass
*Attorney, Agent, or Firm*—Michael N. Mueller

[57] ABSTRACT

A stabilized polysilazane obtained by reacting an inorganic polysilazane having a number average molecular weight of about 100 to about 100,000 with an alcohol, an organic acid, an ester, a ketone, an aldehyde, a mercaptan, or an alkysilazane preferably at a molar ratio of from 50/50 to 99.99/0.01 is described.

3 Claims, 3 Drawing Sheets

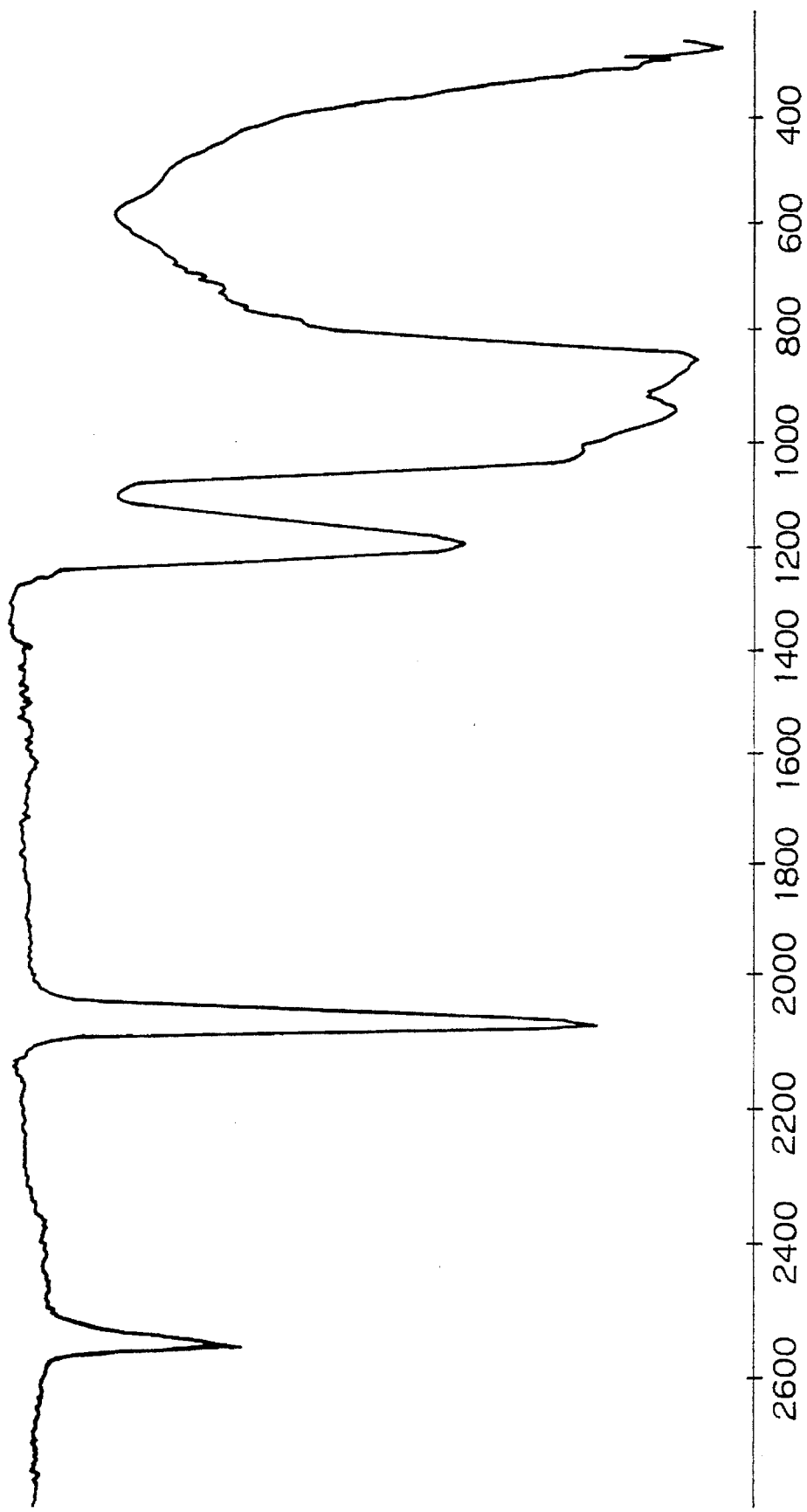
Fig. 2 IR CHART OF POLYSILAZANE

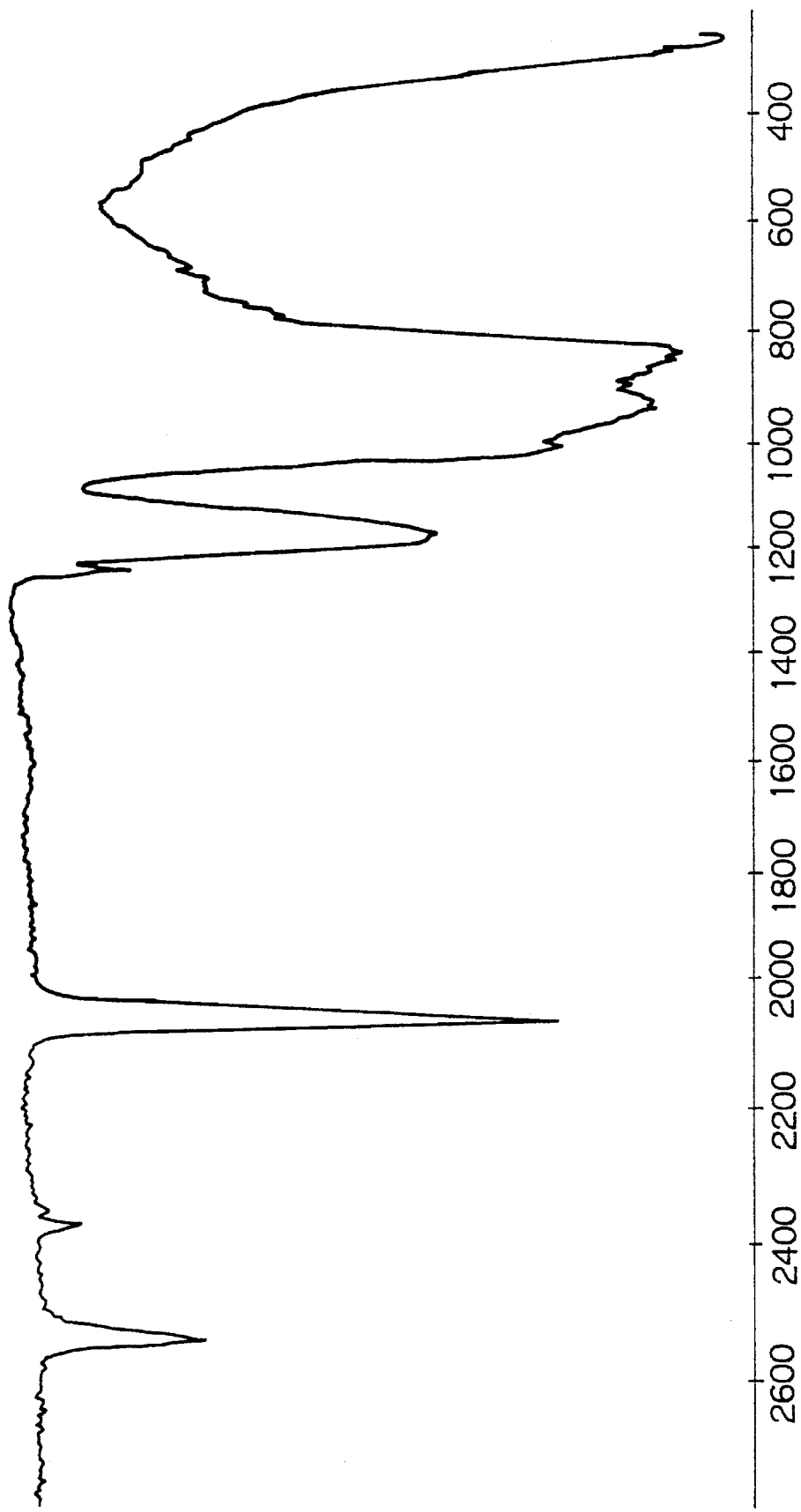

MODIFIED POLYSILAZANE AND PROCESS FOR PREPARATION THEREOF

This application is a continuation of application Ser. No. 08/082,013, filed Jun. 23, 1993 now abandoned, which is a continuation of application Ser. No. 816,378, filed Dec. 27, 1991, now abandoned.

BACKGROUND OF THE INVENTION

1. Field of the Invention

The present invention relates to a modified polysilazane. More particularly, the present invention relates to a modified polysilazane stabilized by reacting an inorganic polysilazane with an alcohol, an organic acid, an ester, a ketone, an aldehyde, an isocyanate, an amide, a mercaptan, an alkylamine, an alkylsilazane or an alkylaminosilane, and a process for the preparation thereof.

2. Description of the Related Art

Silicon nitride and silicon nitride-containing ceramics formed through a polysilazane as a precursor have an excellent high-temperature strength, thermal shock resistance and oxidation resistance, and therefore, are widely used as construction materials and functional materials in various industrial fields.

In general, a polysilazane is valuable as a precursor polymer for silicon nitride ceramics. The polysilazane is soluble in solvents, has an excellent moldability, and gives a high yield of ceramics, and further, is characterized in that the purity of ceramics after firing is high.

Processes for the preparation of inorganic polysilazanes and organic polysilazanes are known. Typically, a polysilazane can be prepared by reacting a halosilane with a Lewis base and reacting the obtained complex compound with ammonia (see, for example, Japanese Examined Patent Publication No. 63-16325).

A polysilazane, especially an inorganic polysilazane, has a low chemical stability, and an increase of the molecular weight and gelation readily occur, and accordingly, the handling property is poor. The stability of the polysilazane and the molecular structure thereof can be controlled to some extent by changing the kind of the halosilane used as the starting material of the polysilazane or changing the mixing ratio of at least two halosilanes, but this control is limited and difficult. Accordingly, the polysilazane is defective in that the handling thereof is poor, and the properties of ceramics by high-temperature firing are not uniform.

SUMMARY OF THE INVENTION

According to the present invention, the above-mentioned problem is solved by preparing a modified polysilazane by reacting an inorganic polysilazane having a number average molecular weight of about 100 to about 100,000 with at least one compound selected from the group consisting of an alcohol, an organic acid, an ester, a ketone, an aldehyde, an isocyanate, an amide, a mercaptan, and an alkylamine, alkylsilazane or alkylaminosilane represented by the following general formula:

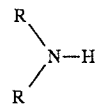

wherein groups R independently represent an alkyl group or

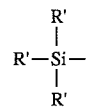

in which groups R' independently represent an alkyl group or a hydrogen atom, with the proviso that at least one of the groups R' is not a hydrogen atom.

An inorganic polysilazane is a polysilazane in which all side chains are composed of hydrogens and no organic group is contained. The process for preparing this inorganic polysilazane is not particularly critical. For example, an inorganic polysilazane prepared according to the process disclosed in the above-mentioned Japanese Examined Patent Publication No. 63-16325 can be used. The molecular weight is not particularly critical, and the molecular weight can be within a range of from about 100 to about 100,000. An inorganic polysilazane having a higher molecular weight is easily gelled and has a poor handling. Accordingly, this inorganic polysilazane can be effectively treated according to the present invention.

As the other reactant to be reacted with the inorganic polysilazane, there can be mentioned an alcohol, an organic acid, an ester, a ketone, an aldehyde, an isocyanate, an amide, a mercaptan, and an alkylamine, alkylsilazane or alkylaminosilane.

The above reactants such as alcohol can be represented by the general formulae: R—OH, R—COOH, R—COOR', R—CO—R', R—CHO, RNCO, RCONH$_2$, RSH, where R and R' are preferably hydrocarbon groups having 1 to 10 carbon atoms. The alkylamine, alkylsilazane or alkylaminosilane is represented by the formula appeared before.

Examples of the preferred alcohol are CH$_3$OH (methanol), C$_2$H$_5$OH (ethanol), n-C$_3$H$_7$OH (n-propanol), n-C$_4$H$_9$OH (n-batanol), n-C$_5$H$_{11}$ (n-pentanol), n-C$_6$H$_{13}$ (n-hexanol), n-C$_7$H$_{15}$OH (n-heptanol), and n-C$_8$H$_{17}$OH (n-octanol).

The reaction molar ratio between the inorganic polysilazane and the reactant such as an alcohol depends on the kind of the starting inorganic polysilazane and desired properties of the modified polysilazane, but preferably this molar ratio is from 50/50 to 99.99/0.01, more preferably from 80/20 to 98/2. If the proportion of the reactant such as an alcohol is too large, the preferred properties of the polysilazane are lost and, for example, the yield of ceramics is reduced.

Preferably, the inorganic polysilazane is reacted with the reactant such as an alcohol in a basic solvent, although the present invention is not limited to this feature. As the basic solvent, pyridine, picoline, trimethylphosphine, methyldiethylphosphine, triethylphosphine, thiophene, furan, and dioxane are preferably used. Pyridine and picoline are especially preferably used in view of the handling property and from the economical viewpoint. The reaction temperature is from 0° to the boiling point of the solvent, and an inert gas such as nitrogen or argon is used as the reaction atmosphere. A reactant, such as an alcohol, is added to a solution of the inorganic polysilazane in the basic solvent while blowing dry nitrogen into the solution, and after termination of the reaction, the basic solvent is replaced by a non-reactive solvent capable of dissolving the polysilazane therein. As the non-reactive solvent, toluene and xylene can be used.

The thus-prepared modified polysilazane has a structure in which parts of hydrogen on the ends and side chains of the inorganic polysilazane are substituted with —OR, etc. By this introduction of the —OR, etc., the inorganic polysilazane is stabilized and the handling property is improved.

According to the present invention, there is provided a process for the preparation of a modified polysilazane, which comprises reacting an organic polysilazane having a molecular weight of about 100 to about 100,000 with at least one compound selected from the group consisting of an alcohol, an organic acid, an ester, a ketone, an aldehyde, an isocyanate, an amide, a mercaptan, and an alkylamine, alkylsilazane or alkylaminosilane represented by the following general formula:

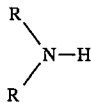

wherein groups R independently represent an alkyl group or

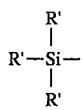

in which groups R' independently represent an alkyl group or a hydrogen atom, with the proviso that at least one of the groups R' is not a hydrogen atom.

According to this process, the polysilazane is modified, and therefore, the molecular structure can be easily controlled. Since the formed modified polysilazane has an improved chemical stability compared to the unmodified inorganic polysilazane, the modified polysilazane has an excellent handling property. Moreover, an unevenness of the properties of ceramics obtained by firing is reduced. Further, since the molecular structure of the polysilazane can be controlled, the purity and heat resistance of ceramics obtained by firing also can be controlled.

BRIEF DESCRIPTION OF THE DRAWINGS

FIG. 2 is an IR chart of the polysilazane of Example 11; and

FIG. 3 is an IR chart of the modified polysilazane of Example 11.

EXAMPLES

Example 1

Figure 1:
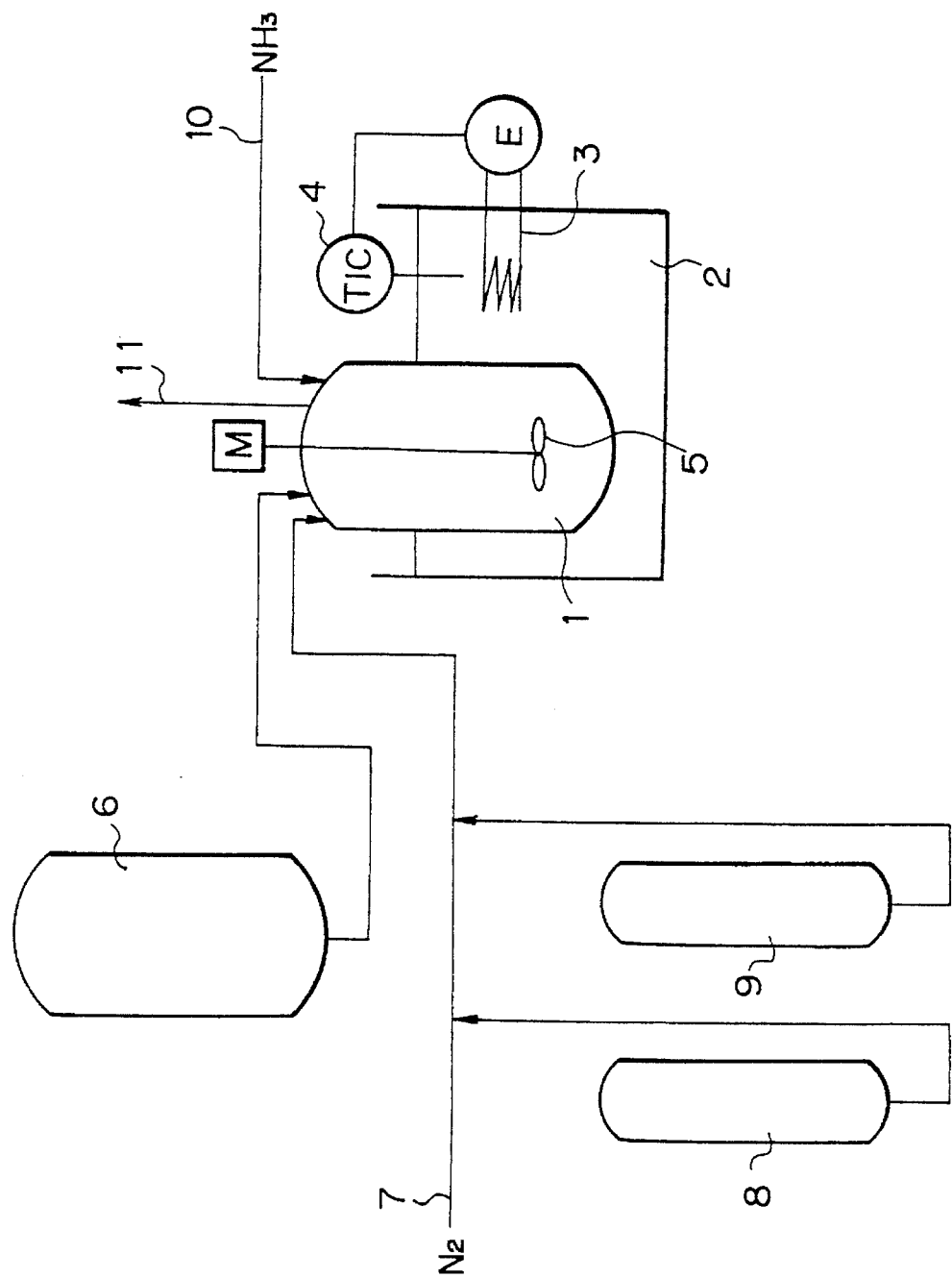
FIG. 1 illustrates an apparatus for synthesizing a polysilazane, as used in the examples of the present invention.

The reaction was carried out by using a synthesis apparatus shown in FIG. 1. In FIG. 1, reference numeral 1 represents a reaction vessel, reference numeral 2 represents a constant-temperature bath, reference numeral 3 represents a heater, reference numeral 4 represents a temperature sensor, reference numeral 6 represents pyridine, reference numeral 7 represents a nitrogen current, reference numeral 8 represents dichlorosilane, reference numeral 9 represents an additive, reference numeral 10 represents ammonia, and reference numeral 11 represents a vent.

The inner atmosphere of the reaction vessel placed in the constant-temperature bath maintained at 0° C. was substituted with dry nitrogen, and 600 ml of dry pyridine was charged in the reaction vessel. The mixture was maintained until the temperature became constant, and 28.3 g of dichlorosilane was added with stirring to form a complex mixture. While the mixture was maintained at 0° C., 14 g of dry ammonia was blown into the mixture with stirring. After termination of the reaction, dry nitrogen was blown into the mixture to remove unreacted ammonia, and the reaction mixture was subjected to filtration under pressure in a nitrogen atmosphere to obtain 392 ml of the filtrate. This solution was heated at 60° C. and ammonia was blown into the solution to increase the pressure to 5 atmospheres. This pressure was maintained for 15 hours. The pressure was lowered to one atmosphere and the mixture was allowed to cool to room temperature, and dry nitrogen was blown into the reaction mixture to remove ammonia therefrom. When the molecular weight of the solute was determined by GPC, it was found that the number average molecular weight as calculated as polystyrene was 2010. The composition molar ratio between nitrogen and silicon in this polymer was 1.01.

To the pyridine solution of this polymer was added 300 ml of o-xylene, and pyridine as the solvent was replaced under reduced pressure by xylene. Then, 4.0 g of methanol ($CH_3OH$) was added, and while blowing dry nitrogen, the mixture was heated at 100° C. and this temperature was maintained for 3 hours. Then, the mixture was cooled to room temperature. When the molecular weight of the solute was measured by GPC, it was found that the number average molecular weight as calculated as polystyrene was 2030. In the obtained polymer, the composition molar ratio between nitrogen and silicon was 1.02.

Example 2

In the same manner as described in Example 1, the reaction was carried out by using the synthesis apparatus shown in FIG. 1.

The inner atmosphere of the reaction vessel placed in the constant-temperature bath maintained at 0° C. was substituted with dry nitrogen, and 600 ml of dry pyridine was charged in the reaction vessel. The mixture was maintained until the temperature became constant, and 28.3 g of dichlorosilane was added with stirring to form a complex mixture. While the mixture was maintained at 0° C., 14 g of dry ammonia was blown into the mixture with stirring. After termination of the reaction, dry nitrogen was blown into the mixture to remove unreacted ammonia, and the reaction mixture was subjected to filtration under pressure in a nitrogen atmosphere to obtain 392 ml of the filtrate. This solution was heated at 60° C. and ammonia was blown into the solution to increase the pressure to 5 atmospheres. This pressure was maintained for 15 hours. The pressure was lowered to one atmosphere and the mixture was allowed to cool to room temperature, and dry nitrogen was blown into the reaction mixture to remove ammonia therefrom. When the molecular weight of the solute was determined by GPC, it was found that the number average molecular weight as calculated as polystyrene was 2010. The composition molar ratio between nitrogen and silicon in this polymer was 1.01.

To the pyridine solution of this polymer was added 300 ml of o-xylene, and pyridine as the solvent was replaced under reduced pressure by xylene. Then, 4.0 g of n-octanol ($C_8H_{17}OH$) was added, and while blowing dry nitrogen, the mixture was heated at 100° C. and this temperature was maintained for 3 hours. Then, the mixture was cooled to room temperature. When the molecular weight of the solute was measured by GPC, it was found that the number average molecular weight as calculated as polystyrene was 2020. In the obtained polymer, the composition molar ratio between nitrogen and silicon was 1.01.

Example 3

In the same manner as described in Example 1, the reaction was carried out by using the synthesis apparatus shown in FIG. 1.

The inner atmosphere of the reaction vessel placed in the constant-temperature bath maintained at 0° C. was substituted with dry nitrogen, and 600 ml of dry pyridine was charged in the reaction vessel. The mixture was maintained until the temperature became constant, and 28.3 g of dichlorosilane was added with stirring to form a complex mixture. While the mixture was maintained at 0° C., 14 g of dry ammonia was blown into the mixture with stirring. After termination of the reaction, dry nitrogen was blown into the mixture to remove unreacted ammonia, and the reaction mixture was subjected to filtration under pressure in a nitrogen atmosphere to obtain 392 ml of the filtrate. This solution was heated at 60° C. and ammonia was blown into the solution to increase the pressure to 5 atmospheres. This pressure was maintained for 15 hours. The pressure was lowered to one atmosphere and the mixture was allowed to cool to room temperature, and dry nitrogen was blown into the reaction mixture to remove ammonia therefrom. When the molecular weight of the solute was determined by GPC, it was found that the number average molecular weight as calculated as polystyrene was 2010. The composition molar ratio between nitrogen and silicon in this polymer was 1.01.

To the pyridine solution of this polymer was added 300 ml of o-xylene, and pyridine as the solvent was replaced under reduced pressure by xylene. Then, 4.0 g of isopropyl isocyanate ($CH_3C_2H_4N{=}C{=}O$) was added, and while blowing dry nitrogen, the mixture was heated at 100° C. and this temperature was maintained for 3 hours. Then, the mixture was cooled to room temperature. When the molecular weight of the solute was measured by GPC, it was found that the number average molecular weight as calculated as polystyrene was 2000. In the obtained polymer, the composition molar ratio between nitrogen and silicon was 1.00.

Example 4

In the same manner as described in Example 1, the reaction was carried out by using the synthesis apparatus shown in FIG. 1.

The inner atmosphere of the reaction vessel placed in the constant-temperature bath maintained at 0° C. was substituted with dry nitrogen, and 600 ml of dry pyridine was charged in the reaction vessel. The mixture was maintained until the temperature became constant, and 28.3 g of dichlorosilane was added with stirring to form a complex mixture. While the mixture was maintained at 0° C., 14 g of dry ammonia was blown into the mixture with stirring. After termination of the reaction, dry nitrogen was blown into the mixture to remove unreacted ammonia, and the reaction mixture was subjected to filtration under pressure in a nitrogen atmosphere to obtain 392 ml of the filtrate. This solution was heated at 60° C. and ammonia was blown into the solution to increase the pressure to 5 atmospheres. This pressure was maintained for 15 hours. The pressure was lowered to one atmosphere and the mixture was allowed to cool to room temperature, and dry nitrogen was blown into the reaction mixture to remove ammonia therefrom. When the molecular weight of the solute was determined by GPC, it was found that the number average molecular weight as calculated as polystyrene was 2010. The composition molar ratio between nitrogen and silicon in this polymer was 1.01.

To the pyridine solution of this polymer was added 300 ml of o-xylene, and pyridine as the solvent was replaced under reduced pressure by xylene. Then, 4.0 g of isobutylamide ($C_3H_7CONH_2$) was added, and while blowing dry nitrogen, the mixture was heated at 100° C. and this temperature was maintained for 3 hours. Then, the mixture was cooled to room temperature. When the molecular weight of the solute was measured by GPC, it was found that the number average molecular weight as calculated as polystyrene was 2000. In the obtained polymer, the composition molar ratio between nitrogen and silicon was 1.02.

Example 5

In the same manner as described in Example 1, the reaction was carried out by using the synthesis apparatus shown in FIG. 1.

The inner atmosphere of the reaction vessel placed in the constant-temperature bath maintained at 0° C. was substituted with dry nitrogen, and 600 ml of dry pyridine was charged in the reaction vessel. The mixture was maintained until the temperature became constant, and 28.3 g of dichlorosilane was added with stirring to form a complex mixture. While the mixture was maintained at 0° C., 14 g of dry ammonia was blown into the mixture with stirring. After termination of the reaction, dry nitrogen was blown into the mixture to remove unreacted ammonia, and the reaction mixture was subjected to filtration under pressure in a nitrogen atmosphere to obtain 392 ml of the filtrate. This solution was heated at 60° C. and ammonia was blown into the solution to increase the pressure to 5 atmospheres. This pressure was maintained for 15 hours. The pressure was lowered to one atmosphere and the mixture was allowed to cool to room temperature, and dry nitrogen was blown into the reaction mixture to remove ammonia therefrom. When the molecular weight of the solute was determined by GPC, it was found that the number average molecular weight as calculated as polystyrene was 2010. The composition molar ratio between nitrogen and silicon in this polymer was 1.01.

To the pyridine solution of this polymer was added 300 ml of o-xylene, and pyridine as the solvent was replaced under reduced pressure by xylene. Then, 4.0 g of trimethylsilanol ($Me_3SiOH$) was added, and while blowing dry nitrogen, the mixture was heated at 100° C. and this temperature was maintained for 3 hours. Then, the mixture was cooled to room temperature. When the molecular weight of the solute was measured by GPC, it was found that the number average molecular weight as calculated as polystyrene was 2025. In the obtained polymer, the composition molar ratio between nitrogen and silicon was 1.03.

Example 6

In the same manner as described in Example 1, the reaction was carried out by using the synthesis apparatus shown in FIG. 1.

The inner atmosphere of the reaction vessel placed in the constant-temperature bath maintained at 0° C. was substituted with dry nitrogen, and 600 ml of dry pyridine was charged in the reaction vessel. The mixture was maintained until the temperature became constant, and 28.3 g of dichlorosilane was added with stirring to form a complex mixture. While the mixture was maintained at 0° C. 14 g of dry ammonia was blown into the mixture with stirring. After termination of the reaction, dry nitrogen was blown into the mixture to remove unreacted ammonia, and the reaction mixture was subjected to filtration under pressure in a nitrogen atmosphere to obtain 392 ml of the filtrate. This solution was heated at 60° C. and ammonia was blown into the solution to increase the pressure to 5 atmospheres. This pressure was maintained for 15 hours. The pressure was lowered to one atmosphere and the mixture was allowed to cool to room temperature, and dry nitrogen was blown into the reaction mixture to remove ammonia therefrom. When the molecular weight of the solute was determined by GPC, it was found that the number average molecular weight as calculated as polystyrene was 2010. The composition molar ratio between nitrogen and silicon in this polymer was 1.01.

To the pyridine solution of this polymer was added 300 ml of o-xylene, and pyridine as the solvent was replaced under reduced pressure by xylene. Then, 4.0 g of acetone ($CH_3COCH_3$) was added, and while blowing dry nitrogen, the mixture was heated at 100° C. and this temperature was maintained for 3 hours. Then, the mixture was cooled to room temperature. When the molecular weight of the solute was measured by GPC, it was found that the number average molecular weight as calculated as polystyrene was 2010. In the obtained polymer, the composition molar ratio between nitrogen and silicon was 1.00.

Example 7

In the same manner as described in Example 1, the reaction was carried out by using the synthesis apparatus shown in FIG. 1.

The inner atmosphere of the reaction vessel placed in the constant-temperature bath maintained at 0° C. was substituted with dry nitrogen, and 600 ml of dry pyridine was charged in the reaction vessel. The mixture was maintained until the temperature became constant, and 28.3 g of dichlorosilane was added with stirring to form a complex mixture. While the mixture was maintained at 0° C., 14 g of dry ammonia was blown into the mixture with stirring. After termination of the reaction, dry nitrogen was blown into the mixture to remove unreacted ammonia, and the reaction mixture was subjected to filtration under pressure in a nitrogen atmosphere to obtain 392 ml of the filtrate. This solution was heated at 60° C. and ammonia was blown into the solution to increase the pressure to 5 atmospheres. This pressure was maintained for 15 hours. The pressure was lowered to one atmosphere and the mixture was allowed to cool to room temperature, and dry nitrogen was blown into the reaction mixture to remove ammonia therefrom. When the molecular weight of the solute was determined by GPC, it was found that the number average molecular weight as calculated as polystyrene was 2010. The composition molar ratio between nitrogen and silicon in this polymer was 1.01.

To the pyridine solution of this polymer was added 300 ml of o-xylene, and pyridine as the solvent was replaced under reduced pressure by xylene. Then, 4.0 g of propionic acid ($C_2H_5COOH$) was added, and while blowing dry nitrogen, the mixture was heated at 100° C. and this temperature was maintained for 3 hours. Then, the mixture was cooled to room temperature. When the molecular weight of the solute was measured by GPC, it was found that the number average molecular weight as calculated as polystyrene was 2030. In the obtained polymer, the composition molar ratio between nitrogen and silicon was 1.03.

Example 8

In the same manner as described in Example 1, the reaction was carried out by using the synthesis apparatus shown in FIG. 1.

The inner atmosphere of the reaction vessel placed in the constant-temperature bath maintained at 0° C. was substituted with dry nitrogen, and 600 ml of dry pyridine was charged in the reaction vessel. The mixture was maintained until the temperature became constant, and 28.3 g of dichlorosilane was added with stirring to form a complex mixture. While the mixture was maintained at 0° C., 14 g of dry ammonia was blown into the mixture with stirring. After termination of the reaction, dry nitrogen was blown into the mixture to remove unreacted ammonia, and the reaction mixture was subjected to filtration under pressure in a nitrogen atmosphere to obtain 392 ml of the filtrate. This solution was heated at 60° C. and ammonia was blown into the solution to increase the pressure to 5 atmospheres. This pressure was maintained for 15 hours. The pressure was lowered to one atmosphere and the mixture was allowed to cool to room temperature, and dry nitrogen was blown into the reaction mixture to remove ammonia therefrom. When the molecular weight of the solute was determined by GPC, it was found that the number average molecular weight as calculated as polystyrene was 2010. The composition molar ratio between nitrogen and silicon in this polymer was 1.01.

To the pyridine solution of this polymer was added 300 ml of o-xylene, and pyridine as the solvent was replaced under reduced pressure by xylene. Then, 4.0 g of ethyl acetate ($CH_3COOC_2H_5$) was added, and while blowing dry nitrogen, the mixture was heated at 100° C. and this temperature was maintained for 3 hours. Then, the mixture was cooled to room temperature. When the molecular weight of the solute was measured by GPC, it was found that the number average molecular weight as calculated as polystyrene was 2000. In the obtained polymer, the composition molar ratio between nitrogen and silicon was 1.01.

Example 9

In the same manner as described in Example 1, the reaction was carried out by using the synthesis apparatus shown in FIG. 1.

The inner atmosphere of the reaction vessel placed in the constant-temperature bath maintained at 0° C. was substituted with dry nitrogen, and 600 ml of dry pyridine was charged in the reaction vessel. The mixture was maintained until the temperature became constant, and 28.3 g of dichlorosilane was added with stirring to form a complex mixture. While the mixture was maintained at 0° C., 14 g of dry ammonia was blown into the mixture with stirring. After termination of the reaction, dry nitrogen was blown into the mixture to remove unreacted ammonia, and the reaction mixture was subjected to filtration under pressure in a nitrogen atmosphere to obtain 392 ml of the filtrate. This solution was heated at 60° C. and ammonia was blown into the solution to increase the pressure to 5 atmospheres. This pressure was maintained for 15 hours. The pressure was lowered to one atmosphere and the mixture was allowed to cool to room temperature, and dry nitrogen was blown into the reaction mixture to remove ammonia therefrom. When the molecular weight of the solute was determined by GPC, it was found that the number average molecular weight as calculated as polystyrene was 2010. The composition molar ratio between nitrogen and silicon in this polymer was 1.01.

To the pyridine solution of this polymer was added 300 ml of o-xylene, and pyridine as the solvent was replaced under reduced pressure by xylene. Then, 4.0 g of acetaldehyde ($CH_3CHO$) was added, and while blowing dry nitrogen, the mixture was heated at 100° C. and this temperature was maintained for 3 hours. Then, the mixture was cooled to room temperature. When the molecular weight of the solute was measured by GPC, it was found that the number average molecular weight as calculated as polystyrene was 2005. In the obtained polymer, the composition molar ratio between nitrogen and silicon was 1.01.

Example 10

In the same manner as described in Example 1, the reaction was carried out by using the synthesis apparatus shown in FIG. 1.

The inner atmosphere of the reaction vessel placed in the constant-temperature bath maintained at 0° C. was substituted with dry nitrogen, and 600 ml of dry pyridine was charged in the reaction vessel. The mixture was maintained until the temperature became constant, and 28.3 g of dichlorosilane was added with stirring to form a complex mixture. While the mixture was maintained at 0° C., 14 g of dry ammonia was blown into the mixture with stirring. After termination of the reaction, dry nitrogen was blown into the mixture to remove unreacted ammonia, and the reaction mixture was subjected to filtration under pressure in a nitrogen atmosphere to obtain 392 ml of the filtrate. This solution was heated at 60° C. and ammonia was blown into the solution to increase the pressure to 5 atmospheres. This pressure was maintained for 15 hours. The pressure was lowered to one atmosphere and the mixture was allowed to cool to room temperature, and dry nitrogen was blown into the reaction mixture to remove ammonia therefrom. When the molecular weight of the solute was determined by GPC, it was found that the number average molecular weight as calculated as polystyrene was 2010. The composition molar ratio between nitrogen and silicon in this polymer was 1.01.

To the pyridine solution of this polymer was added 300 ml of o-xylene, and pyridine as the solvent was replaced under reduced pressure by xylene. Then, 4.0 g of n-butylmercaptan (n-$C_4H_9SH$) was added, and while blowing dry nitrogen, the mixture was heated at 100° C. and this temperature was maintained for 3 hours. Then, the mixture was cooled to room temperature. When the molecular weight of the solute was measured by GPC, it was found that the number average molecular weight as calculated as polystyrene was 2010. In the obtained polymer, the composition molar ratio between nitrogen and silicon was 1.03.

Comparative Example 1

The inner atmosphere of the reaction vessel placed in the constant-temperature bath maintained at 0° C. was substituted with dry nitrogen, and 600 ml of dry pyridine was charged in the reaction vessel. The mixture was maintained until the temperature became constant, and 28.3 g of dichlorosilane was added with stirring to form a complex mixture. While the mixture was maintained at 0° C., 14 g of dry ammonia was blown into the mixture with stirring. After termination of the reaction, dry nitrogen was blown into the mixture to remove unreacted ammonia, and the reaction mixture was subjected to filtration under pressure in a nitrogen atmosphere to obtain 392 ml of the filtrate. This solution was heated at 60° C. and ammonia was blown into the solution to increase the pressure to 5 atmospheres. This pressure was maintained for 15 hours. The pressure was lowered to one atmosphere and the mixture was allowed to cool to room temperature, and dry nitrogen was blown into the reaction mixture to remove ammonia therefrom. When the molecular weight of the solute was determined by GPC, it was found that the number average molecular weight as calculated as polystyrene was 2010. The composition molar ratio between nitrogen and silicon in this polymer was 1.01.

To the pyridine solution of this polymer was added 300 ml of o-xylene, and pyridine as the solvent was replaced under reduced pressure by xylene.

When the molecular weight of the solute was measured by GPC, it was found that the number average molecular weight as calculated as polystyrene was 2650. In the obtained polymer, the composition molar ratio between nitrogen and silicon was 1.01.

Changes of the molecular weight and composition before and after the solvent substitution in the examples and comparative example are summarized in Table 1.

The stability in air was evaluated with respect to each of the examples and comparative example. The results are shown in Table 2.

TABLE 1

| | Additive | Before Solvent Substitution | | After Solvent Substitution | |
| --- | --- | --- | --- | --- | --- |
| | | Number average molecular weight | Si/N | Number average molecular weight | Si/N |
| Example 1 | $CH_3OH$ | 2010 | 1.01 | 2030 | 1.02 |
| Example 2 | n-$C_8H_{17}OH$ | 2010 | 1.01 | 2020 | 1.01 |
| Example 3 | $CH_3C_2H_4NCO$ | 2010 | 1.01 | 2000 | 1.00 |
| Example 4 | $C_3H_7CONH_3$ | 2010 | 1.01 | 2000 | 1.02 |
| Example 5 | $(CH_3)_3SiOH$ | 2010 | 1.01 | 2025 | 1.03 |
| Example 6 | $CH_3COCH_3$ | 2010 | 1.01 | 2010 | 1.00 |
| Example 7 | $C_2H_5COOH$ | 2010 | 1.01 | 2030 | 1.03 |
| Example 8 | $CH_3COOC_2H_5$ | 2010 | 1.01 | 2000 | 1.01 |
| Example 9 | $CH_3CHO$ | 2010 | 1.01 | 2005 | 1.01 |
| Example 10 | n-$C_4H_9SH$ | 2010 | 1.01 | 2010 | 1.03 |
| Comparative Example 1 | not added | 2010 | 1.01 | 2650 | 1.01 |

TABLE 2

| | Additive | Stability against 24 Hours' Exposure to Air |
| --- | --- | --- |
| Example 1 | $CH_3OH$ | good |
| Example 2 | n-$C_8H_{17}OH$ | good |
| Example 3 | $CH_3C_2H_4NCO$ | good |
| Example 4 | $C_3H_7CONH_3$ | good |
| Example 5 | $(CH_3)_3SiOH$ | good |
| Example 6 | $CH_3COCH_3$ | good |
| Example 7 | $C_2H_5COOH$ | good |
| Example 8 | $CH_3COOC_2H_5$ | good |
| Example 9 | $CH_3CHO$ | good |
| Example 10 | n-$C_4H_9SH$ | good |
| Comparative Example 1 | not added | gelled |

Note: relative humidity in air: 80%

Example 11

The inner atmosphere of the reaction vessel placed in the constant-temperature bath maintained at 0° C. was substituted with dry nitrogen, and 600 ml of dry pyridine was charged in the reaction vessel. The mixture was maintained until the temperature became constant, and 28.3 g of dichlorosilane was added with stirring to form a complex mixture. While the mixture was maintained at 0° C., 14 g of dry ammonia was blown into the mixture with stirring. After termination of the reaction, dry nitrogen was blown into the mixture to remove unreacted ammonia, and the reaction mixture was subjected to filtration under pressure in a nitrogen atmosphere to obtain 392 ml of the filtrate. This solution was heated at 60° C. and ammonia was blown into the solution to increase the pressure to 5 atmospheres. This pressure was maintained for 15 hours. The pressure was lowered to one atmosphere and the mixture was naturally cooled to room temperature, and dry nitrogen was blown into the reaction mixture to remove ammonia therefrom. When the molecular weight of the solute was determined by GPC, it was found that the number average molecular weight as calculated as polystyrene was 2010. When the IR spectrum of the solute was analyzed (FIG. 2), there were observed absorptions attributed to N—H at wave numbers (cm$^{-1}$) of 3350 and 1175, an absorption attributed to Si—H at 2170, and an absorption attributed to Si—N—Si at 1020 to 820. From the results of the elementary analysis, it was confirmed that the content of Si was 56.1% by weight, the content of N was 27.9% by weight, the content of O was 0.48% by weight and the content of C was 9.7% by weight. The composition molar ratio between nitrogen and silicon was 1.01.

Then, 4.0 g hexamethyldisilazane [$(CH_3)_3SiNHSi(CH_3)_3$] was added to the pyridine solution of this polymer, and while blowing dry nitrogen, the mixture was heated at 60° C. and this temperature was maintained for 3 hours. Then, the mixture was cooled to room temperature. Then, 300 ml of o-dry xylene was added to the solution, and the solvent substitution of pyridine with xylene was carried out under reduced pressure. When the molecular weight of the solute was measured by GPC, it was found that the number average molecular weight as calculated as polystyrene was 2015. When the IR spectrum of the solute was analyzed (FIG. 2), there were observed absorptions attributed to N—H at wave numbers (cm$^{-1}$) of 3350 and 1175, an absorption attributed to Si—H at 2170, an absorption attributed to Si—N—Si at 1020 to 80, an absorption attributed to Si—Me at 1250 and an absorption attributed C—H at 3000 were observed. From the results of the elementary analysis of the polymer, it was confirmed that the content of Si was 56.2% by weight, the content of N was 27.8% by weight, the content of O was 0.40% by weight and the content of C was 9.7% by weight. The composition molar ratio between nitrogen and silicon was 1.02.

Example 12

The inner atmosphere of the reaction vessel placed in the constant-temperature bath maintained at 0° C. was substituted with dry nitrogen, and 600 ml of dry pyridine was charged in the reaction vessel. The mixture was maintained until the temperature became constant, and 28.3 g of dichlorosilane was added with stirring to form a complex mixture. While the mixture was maintained at 0° C., 14 g of dry ammonia was blown into the mixture with stirring. After termination of the reaction, dry nitrogen was blown into the mixture to remove unreacted ammonia, and the reaction mixture was subjected to filtration under pressure in a nitrogen atmosphere to obtain 392 ml of the filtrate. This solution was heated at 60° C. and ammonia was blown into the solution to increase the pressure to 5 atmospheres. This pressure was maintained for 15 hours. The pressure was lowered to one atmosphere and the mixture was allowed to cool to room temperature, and dry nitrogen was blown into the reaction mixture to remove ammonia therefrom. When the molecular weight of the solute was determined by GPC, it was found that the number average molecular weight as calculated as polystyrene was 2010. The composition molar ratio between nitrogen and silicon in this polymer was 1.01.

To the pyridine solution of this polymer was added 4.0 g of hexaethyldisilazane [$(C_2H_5)_3SiNHSi(C_2H_5)_3$] and while blowing dry nitrogen, the mixture was heated at 60° C. and this temperature was maintained for 3 hours. Then, the mixture was cooled to room temperature. Then, 300 ml of dry o-xylene was added to the solution, and the solvent substitution of pyridine with xylene was carried out under reduced pressure. When the molecular weight of the solute was measured by GPC, it was found that the number average molecular weight as calculated as polystyrene was 2012. In the obtained polymer, the composition molar ratio between nitrogen and silicon was 1.00.

Example 13

The inner atmosphere of the reaction vessel placed in the constant-temperature bath maintained at 0° C. was substituted with dry nitrogen, and 600 ml of dry pyridine was charged in the reaction vessel. The mixture was maintained until the temperature became constant, and 28.3 g of dichlorosilane was added with stirring to form a complex mixture. While the mixture was maintained at 0° C., 14 g of dry ammonia was blown into the mixture with stirring. After termination of the reaction, dry nitrogen was blown into the mixture to remove unreacted ammonia, and the reaction mixture was subjected to filtration under pressure in a nitrogen atmosphere to obtain 392 ml of the filtrate. This solution was heated at 60° C. and ammonia was blown into the solution to increase the pressure to 5 atmospheres. This pressure was maintained for 15 hours. The pressure was lowered to one atmosphere and the mixture was allowed to cool to room temperature, and dry nitrogen was blown into the reaction mixture to remove ammonia therefrom. When the molecular weight of the solute was determined by GPC, it was found that the number average molecular weight as calculated as polystyrene was 2010. The composition molar ratio between nitrogen and silicon in this polymer was 1.01.

To the pyridine solution of the polymer was added 4.0 g of $(CH_3)_3SiNHCH_3$, and the mixture was heated at 60° C. while blowing dry nitrogen and this temperature was maintained for 3 hours. Then, the temperature was lowered to room temperature. Then, 300 ml of dry o-xylene was added and pyridine was substituted with xylene under reduced pressure. When the molecular weight of the solute was measured by GPC, it was found that the number average molecular weight as calculated as polystyrene was 2020. The composition molar ratio between nitrogen and silicon in the polymer was 1.02.

Example 14

The inner atmosphere of the reaction vessel placed in the constant-temperature bath maintained at 0° C. was substituted with dry nitrogen, and 600 ml of dry pyridine was charged in the reaction vessel. The mixture was maintained until the temperature became constant, and 28.3 g of dichlorosilane was added with stirring to form a complex mixture. While the mixture was maintained at 0° C., 14 g of dry ammonia was blown into the mixture with stirring. After termination of the reaction, dry nitrogen was blown into the mixture to remove unreacted ammonia, and the reaction mixture was subjected to filtration under pressure in a nitrogen atmosphere to obtain 392 ml of the filtrate. This solution was heated at 60° C. and ammonia was blown into the solution to increase the pressure to 5 atmospheres. This pressure was maintained for 15 hours. The pressure was lowered to one atmosphere and the mixture was allowed to cool to room temperature, and dry nitrogen was blown into the reaction mixture to remove ammonia therefrom. When the molecular weight of the solute was determined by GPC, it was found that the number average molecular weight as calculated as polystyrene was 2010. The composition molar ratio between nitrogen and silicon in this polymer was 1.01.

To the pyridine solution of the polymer was added 4.0 g of diethylamine [$NH(C_2H_5)_2$], and the mixture was heated at 60° C. while blowing dry nitrogen and this temperature was maintained for 3 hours. Then, the temperature was lowered to room temperature. Then, 300 ml of dry o-xylene was added and pyridine was substituted with xylene under reduced pressure. When the molecular weight of the solute was measured by GPC, it was found that the number average molecular weight as calculated as polystyrene was 2010. The composition molar ratio between nitrogen and silicon in the polymer was 1.01.

Example 15

The inner atmosphere of the reaction vessel placed in the constant-temperature bath maintained at 0° C. was substituted with dry nitrogen, and 600 ml of dry pyridine was charged in the reaction vessel. The mixture was maintained until the temperature became constant, and 28.3 g of dichlorosilane was added with stirring to form a complex mixture. While the mixture was maintained at 0° C., 14 g of dry ammonia was blown into the mixture with stirring. After termination of the reaction, dry nitrogen was blown into the mixture to remove unreacted ammonia, and the reaction mixture was subjected to filtration under pressure in a nitrogen atmosphere to obtain 392 ml of the filtrate. This solution was heated at 60° C. and ammonia was blown into the solution to increase the pressure to 5 atmospheres. This pressure was maintained for 15 hours. The pressure was lowered to one atmosphere and the mixture was allowed to cool to room temperature, and dry nitrogen was blown into the reaction mixture to remove ammonia therefrom. When the molecular weight of the solute was determined by GPC, it was found that the number average molecular weight as calculated as polystyrene was 2010. The composition molar ratio between nitrogen and silicon in this polymer was 1.01.

To the pyridine solution of the polymer was added 4.0 g of tetramethyldisilazane [$(CH_3)_2HSiNHSiH(CH_3)_2$], and the mixture was heated at 60° C. while blowing dry nitrogen and this temperature was maintained for 3 hours. Then, the temperature was lowered to room temperature. Then, 300 ml of dry o-xylene was added and pyridine was substituted with xylene under reduced pressure. When the molecular weight of the solute was measured by GPC, it was found that the number average molecular weight as calculated as polystyrene was 2018. The composition molar ratio between nitrogen and silicon in the polymer was 1.03.

Example 16

The inner atmosphere of the reaction vessel placed in the constant-temperature bath maintained at 0° C. was substituted with dry nitrogen, and 600 ml of dry pyridine was charged in the reaction vessel. The mixture was maintained until the temperature became constant, and 28.3 g of dichlorosilane was added with stirring to form a complex mixture. While the mixture was maintained at 0° C., 14 g of dry ammonia was blown into the mixture with stirring. After termination of the reaction, dry nitrogen was blown into the mixture to remove unreacted ammonia, and the reaction mixture was subjected to filtration under pressure in a nitrogen atmosphere to obtain 392 ml of the filtrate. This solution was heated at 60° C. and ammonia was blown into the solution to increase the pressure to 5 atmospheres. This pressure was maintained for 15 hours. The pressure was then lowered to one atmosphere and the mixture was allowed to cool to room temperature, and dry nitrogen was blown into the reaction mixture to remove ammonia therefrom. When the molecular weight of the solute was determined by GPC, it was found that the number average molecular weight as calculated as polystyrene was 2010. The composition molar ratio between nitrogen and silicon in this polymer was 1.01.

To the pyridine solution of this polymer was added 300 ml of o-xylene to replace the solvent from the pyridine with xylene. 4.0 g of hexamethyldisilazane [$(CH_3)_3SiNHSi(CH_3)_3$], and while blowing dry nitrogen, the mixture was heated at 100° C. and this temperature was maintained for 3 hours. Then, the mixture was cooled to room temperature. When the molecular weight of the solute was measured by GPC, it was found that the number average molecular weight as calculated as polystyrene was 2012. In the obtained polymer, the composition molar ratio between nitrogen and silicon was 1.00.

Changes of the molecular weight and composition before and after the solvent substitution in the examples and comparative example 1 are summarized in Table 3.

The stability in air was evaluated with respect to each of the examples and comparative example 1. The results are shown in Table 4.

TABLE 3

|  | Example 11 | Example 12 | Example 13 | Example 14 | Example 15 | Example 16 | Comparative Example 1 |
|---|---|---|---|---|---|---|---|
| Additive | hexamethyl-disilazane | hexaethyl-disilazane | $(CH_3)_3SiNHCH_3$ | diethylamine | tetramethyl-disilazane | hexamethyl-disilazane | not added |
| Before Solvent Substitution |  |  |  |  |  |  |  |
| number average molecular weight | 2010 | 2010 | 2010 | 2010 | 2010 | 2010 | 2010 |
| Si/N | 1.01 | 1.01 | 1.01 | 1.01 | 1.01 | 1.01 | 1.01 |
| After Solvent Substitution |  |  |  |  |  |  |  |
| number average molecular weight | 2015 | 2012 | 2020 | 2010 | 2018 | 2012 | 2650 |

TABLE 3-continued

|  | Example 11 | Example 12 | Example 13 | Example 14 | Example 15 | Example 16 | Comparative Example 1 |
|---|---|---|---|---|---|---|---|
| Si/N | 1.02 | 1.00 | 1.02 | 1.01 | 1.03 | 1.00 | 1.01 |

TABLE 4

|  | Example 11 | Example 12 | Example 13 | Example 14 | Example 15 | Example 16 | Comparative Example 1 |
|---|---|---|---|---|---|---|---|
| Additive | hexamethyl-disilazane | hexaethyl-disilazane | tris(methyl)-methylamino-silane | diethylamine | tetramethyl-disilazane | hexamethyl-disilazane | not added |
| Stability against 24 Hours' Exposure to Air | good | good | good | good | good | good | gelled |

Note relative humidity in air: 80%

We claim:

1. A process for the stabilization of an inorganic polysilazane, which comprises reacting (A) an inorganic polysilazane having a number average molecular weight of about 100 to about 100,000 with (B) at least one reactant compound selected from the group consisting of a monoalcohol, an organic monoacid, a monoester, a monoketone, a monoaldehyde, a monomercaptan, and an alkylsilazane and wherein the alkylsilazane is represented by the following general formula:

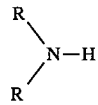

wherein groups R independently represent

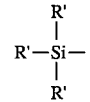

in which groups R' independently represent an alkyl group wherein the reaction is conducted in a basic solvent at a temperature of from 0° C. to the boiling point of the solvent in such a manner that only one polysilazane (A) is present in the polymer after the above reaction, wherein (A) is stabilized by bonding (B) to a side chain or end group of (A) and wherein the resulting polysilazane reaction product is stabilized and has not essentially increased in molecular weight due to cross linkage.

2. A process as set forth in claim 1, wherein the molar ratio of the inorganic polysilazane to said at least one compound is in the range of from 50/50 to 99.99/0.01.

3. A process as set forth in claim 2, wherein said molar ratio is 80:20 to 98:2.

* * * * *